UNITED STATES PATENT OFFICE.

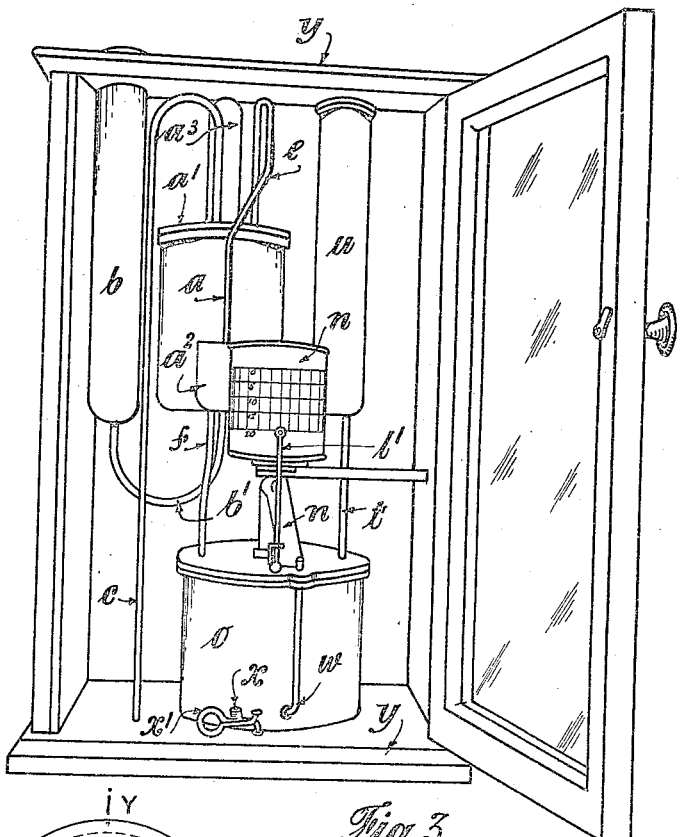
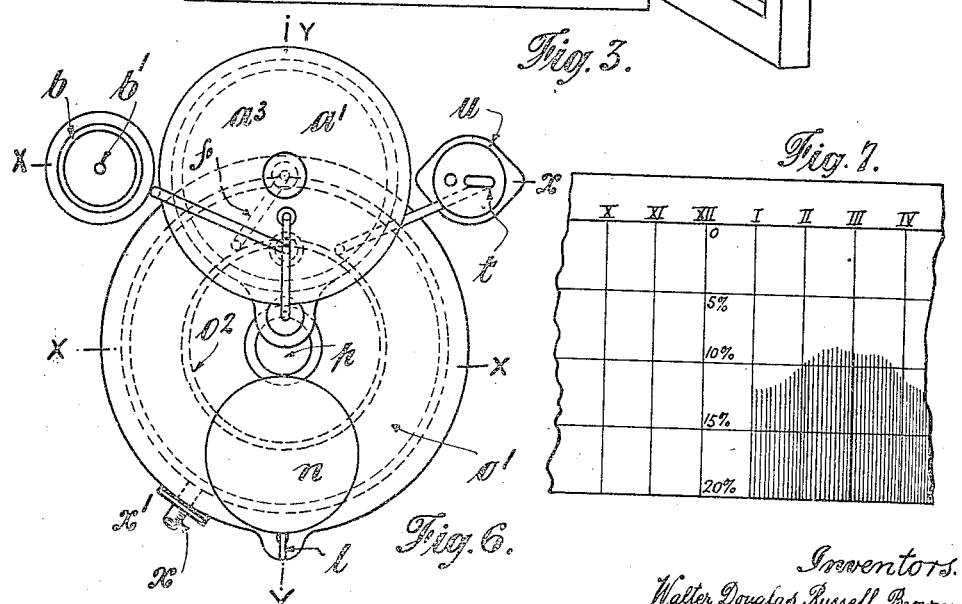

WALTER DOUGLAS RUSSELL BROWN AND WILLIAM THOMAS PICKSTON, OF BOLTON, ENGLAND.

APPARATUS FOR AUTOMATIC AND CONTINUOUS ANALYSIS AND RECORDING OF GASES.

1,422,080. Specification of Letters Patent. Patented July 11, 1922.

Application filed December 15, 1919. Serial No. 344,989.

*To all whom it may concern:*

Be it known that we, WALTER DOUGLAS RUSSELL BROWN and WILLIAM THOMAS PICKSTON, both subjects of the King of Great Britain and Ireland, and residents of Bolton, in the county of Lancaster, England, have invented certain new or Improved Apparatus for Automatic and Continuous Analysis and Recording of Gases, of which the following is a specification.

This invention refers to the automatic and continuous analysis of gases by the absorption process and to the automatic and continuous recording of the results of the process upon a chart. The invention is more particularly applicable to recording the amount of carbonic acid gas ($CO_2$) in exit gases from boiler furnaces, although it can also be used for analyzing and recording gases other than carbonic acid gas in exits, flues or other portions of industrial plants.

According to the invention, the improved analyzing and recording apparatus comprises a closed vessel into which the flue or other gases to be analyzed are intermittently and automatically drawn from the boiler flue, or other exit, and out of which the said gases are intermittently and automatically discharged into a further vessel containing chemicals by which the desired analysis is effected, said filling and emptying of the vessel with gases being effected by the alternate partial emptying and refilling of the vessel with water under the control of a siphon, and under the control of a regulatable and constantly running supply of liquid.

It also consists in means whereby, during the filling of the vessel with water, a portion of the gases is discharged into the atmosphere and the remainder is delivered into the said further vessel containing the chemicals. The apparatus also consists of an inverted bell or float adapted to be acted upon by the analyzed gases and to operate a pen-carrying arm which will indicate on a clock-driven chart when the quantity of carbonic acid gas, or other gas absorbed by the chemical, is less than a fixed maximum. Other features of the apparatus are an automatic release for the analyzed gases; an improved form of siphon pipe; an improved form of supply cistern, and an arrangement of pipes whereby the action of the apparatus once started is entirely independent of valves.

The invention will be further described with reference to the accompanying drawings, in which:

Fig. 3 illustrates a front perspective exterior view of the apparatus shown in Fig. 2 and its casing.

Figure 4:
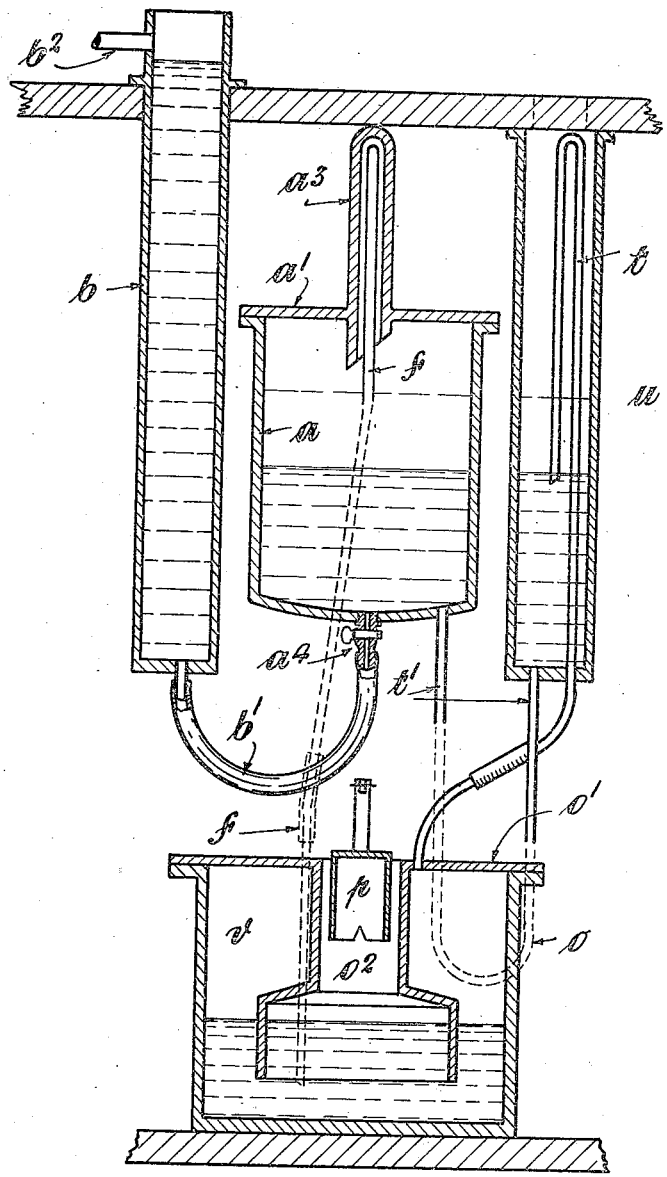
Figs. 4 and 5 illustrate geometric vertical sections.
Figure 5:
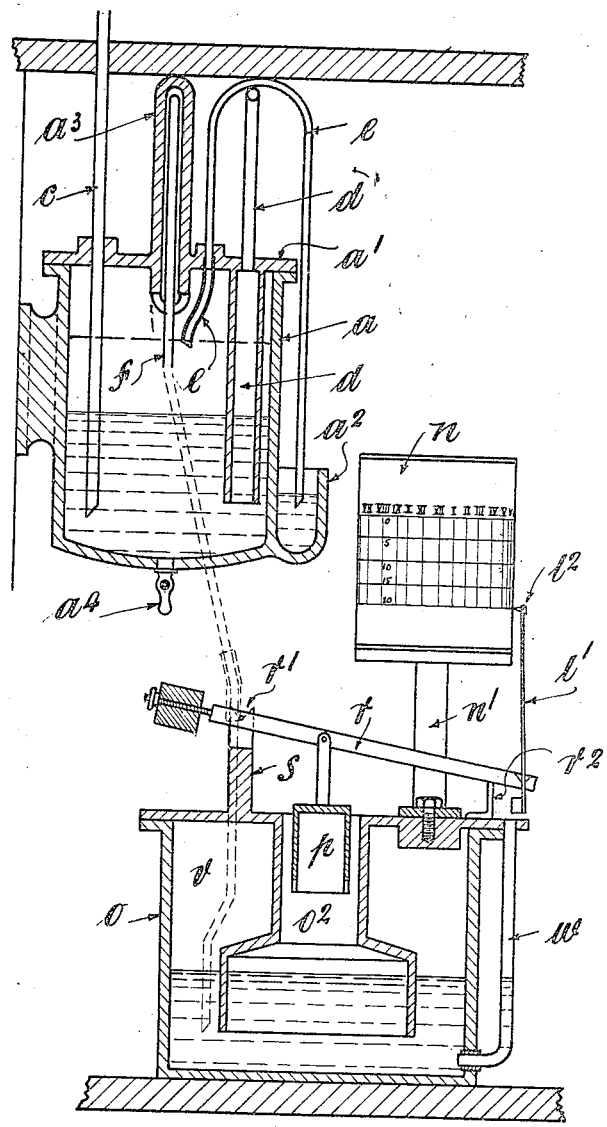

Fig. 6 a plan of the same apparatus, the sections in Fig. 4 being taken on lines $x$—$x$, see Fig. 6, and the section in Fig. 5 being taken on line $y$—$y$.

Figure 1:
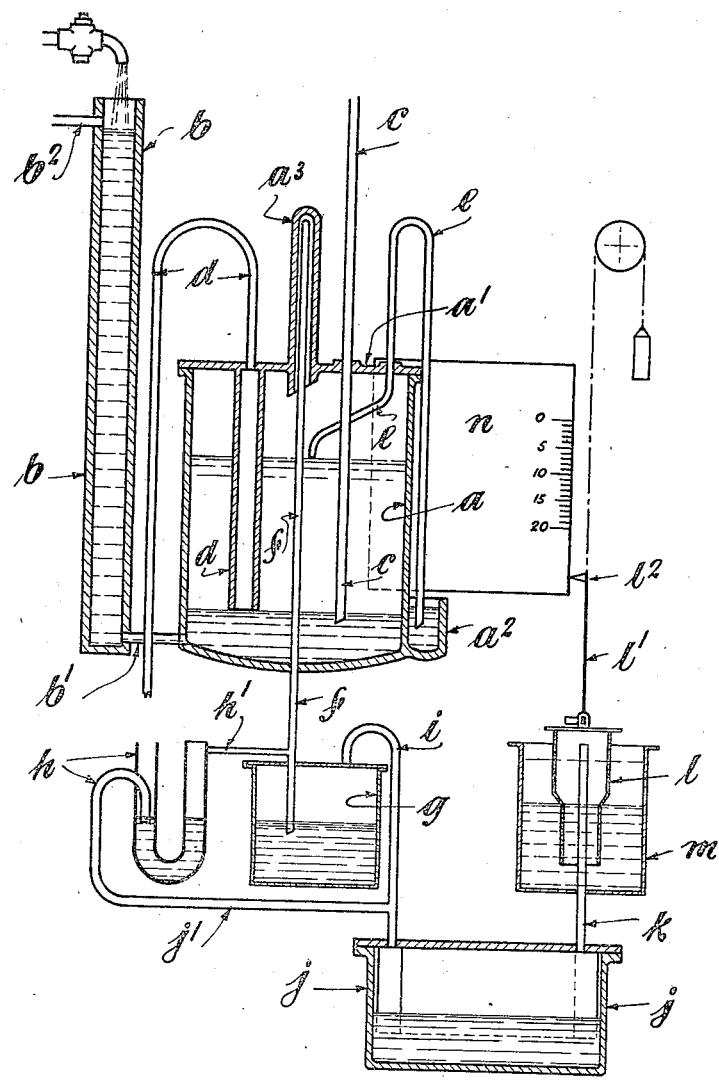
Fig. 1 illustrates diagrammatically a sectional elevation of one example of the improved apparatus.

Referring to Fig. 1, $a$ is a cast-iron or other suitable vessel, preferably cylindrical, and fitted with a gas-tight lid $a'$. Alongside or near such vessel is a tube $b$, closed at the bottom end and open at the top, such tube constituting a cistern for receiving and holding a head of water, the water running in slowly from any suitable source of supply. Said tube or cistern $b$ is connected at its lower end by a pipe $b'$ with the lower part of the vessel $a$. Extending into said vessel and reaching down to a point near its lower end is a pipe $c$, such pipe serving to convey the flue gases into the vessel $a$, which constitutes a gas-collecting chamber. Extending through the lid $a'$ is a siphon pipe $d$, that part of the pipe within the vessel being wider than the part outside the vessel, for the reasons hereinafter explained. The lower end of such wider part extends down to a level slightly higher than the lower end of the gas inlet pipe $c$. A further pipe $e$ also passes into the vessel but only for a short distance, such pipe being provided for the purpose of allowing a portion of the gases to escape into the atmosphere and to ensure of the remaining flue gases in the vesesl being a good average. The other end of the pipe $e$ extends into a small pocket $a^2$ cast on the vessel $a$ and containing water for the purpose of sealing the pipe end. Extending upwards from the top of the lid $a'$ is a thimble like extension $a^3$, which rises to a level slightly higher than the bend of the siphon pipe $d$. Projecting up into such extension and down through the floor of the vessel $a$, is a further pipe $f$, such pipe constituting the conduit through which the gases to be analyzed are conveyed from the vessel $a$. Said pipe $f$ extends into a further vessel $g$ containing mercury, by which the lower end of the pipe is sealed. Adjacent to the vessel $g$ is a U tube $h$, also containing mercury, the upper end of one limb being closed and the space above the mercury in such limb being connected by a pipe $h'$ with the pipe $f$. Extending from the top of the vessel $g$ is a pipe $i$ which at its other and lower end communicates with the interior of a vessel $j$ containing the chemicals for analyzing the gases and hereinafter called the gas absorption vessel. Extending downwards from the lid of such gas absorption vessel may be a flange or flanges $j'$ dipping into the elements and arranged to produce a tortuous passage for the gases to follow in passing through the vessel.

At the end of the vessel furthest from the end at which the pipe $i$ enters, is an outlet pipe $k$ which extends upwards into an inverted cylindrical hollow float or bell $l$ arranged within a further vessel $m$, this latter being partly filled with water. The float or bell is preferably made to two diameters as shown, and is counterbalanced, or nearly so, by a weight.

Pivotally connected to the float or bell, is a counterweighted arm $l'$ carrying a pen $l^2$. This latter normally bears lightly against the face of a chart carried upon a clock-driven drum $n$. Said chart is marked with vertical and horizontal lines, the former representing time and the latter representing percentages. These latter will usually be from 0% to 20%, the zero percentage mark being uppermost. The pen is normally set to bear against the chart below the zero point as hereinafter explained. Extending from the gas absorption vessel $j$ is a pipe $j'$ the other end of which passes into the open-ended limb of the U tube $h$ and normally down into the mercury within the tube.

The action of the apparatus is as follows: Water being admitted into the cistern $b$, it flows into and gradually fills the vessel $a$, any air being dispelled through the siphon pipe $d$ and pipes $e$ and $f$. On the water rising to the level of the bend of the siphon pipe $d$ a siphonic action is started, whereupon the water in the vessel $a$ is emptied until the lower end of the shorter limb of the pipe $d$ is uncovered, when the siphonic action ceases. With the fall of the level of the water in the vessel $a$, a vacuum is formed in the space above the level of the water, and under such vacuum, gases from the furnace flue are caused to enter the vessel via the pipe $c$, the gases bubbling through the water even with a considerable depth of water above the lower end of the pipe. With the continued inflow of water from the cistern $b$ the water again fills the vessel $a$ and this time first drives a portion of the gases out through the pipe $e$ and then drives the remainder down through the pipe $f$ into the absorption vessel $j$ via the vessel $g$.

Any $CO_2$ in the gases is absorbed by the chemicals (caustic potash) in the vessel $j$. The chart will preferably be marked to indicate 20% of $CO_2$ downwards, and the pen will normally lie at a point below 20% mark, the intervening space representing the distance the pen has to move for the remaining 80% of the gases. The analyzed gases collect within the larger part of the float and lift the pen from the lowest position to the 20% mark. Should there have been less than 20% of $CO_2$ in the gases, the gases continue to enter the float and raise it still further, and thus cause the pen to indicate and record the reduced percentage of $CO_2$. The narrowing of the float permits of a comparatively long and quick vertical movement of the pen for small differences in the percentages of $CO_2$.

With the subsequent emptying of the vessel $a$ of water, a fresh charge of gases enters the vessel, and with each refilling of the vessel with water, the gases are discharged into the gas absorption vessel $j$. The speed at which the apparatus works is determined by the rate at which the water enters or leaves the cistern $b$.

After each test, the gases in the vessel $j$ are automatically released and discharged to atmosphere through pipe $j'$. That is to say, during the drawing in of a fresh charge of gases in vessel $a$, the level of the mercury in the right hand limb of the U tube $h$ is raised by the vacuum in the vessel $a$, thereby unsealing the end of the pipe $j'$ and allowing the tested gases to pass from the vessel $j$ and from beneath the float $l$ into the atmosphere, the time taken for the drawing in of the fresh gases into vessel $a$ being sufficient to all of the escape of the tested gases from the vessel $j$.

Figure 2:
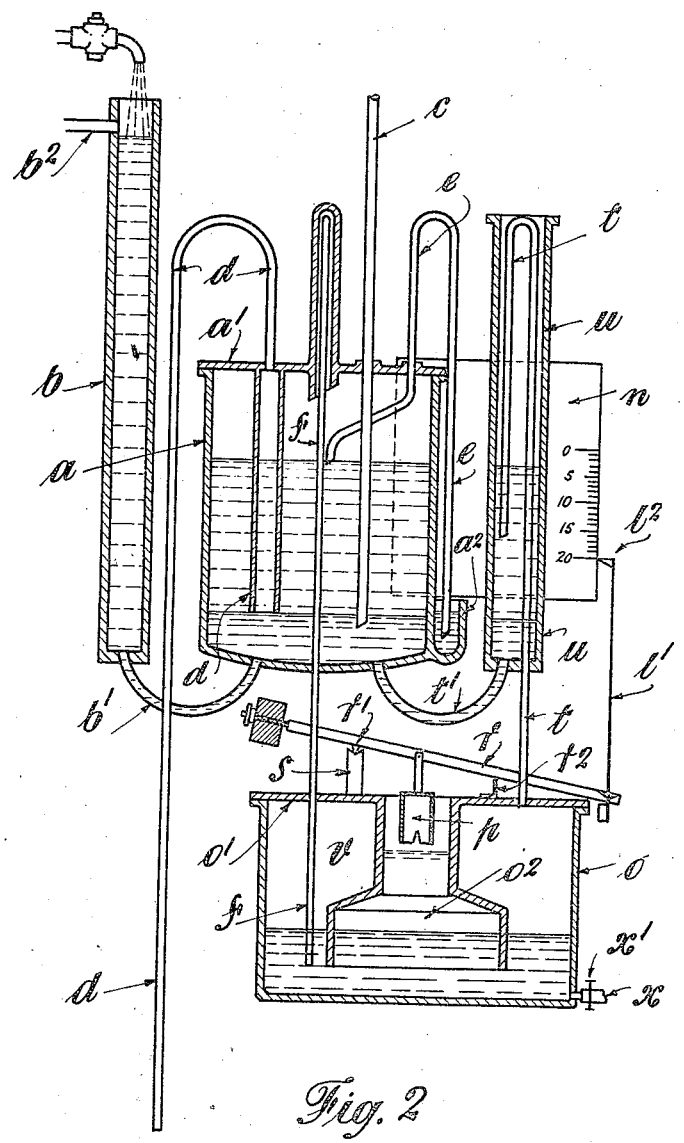
Fig. 2 illustrates a like view of a further example.

Referring now to Fig. 2, the upper part of the apparatus therein shown is similar to that shown in Fig. 1, but differing in that the pipe $b'$ connecting the bottom of the cistern $b$ with the vessel $a$ is curved instead of straight and is taken from the bottom face of the cistern $b$ to the underface of the vessel $a$ so as to more effectively ensure of the water entering the vessel $a$ free of air bubbles and so also (if desired) to allow of the pipe, which may be flexible, being periodically disconnected from the vessel $a$ and the vessel drained, a cock-controlled nipple $a^4$ being provided (see Figs. 4 and 5) to allow of the outlet being opened and closed when the pipe is disconnected. In this latter case, the nipple will preferably be central to the bottom of the vessel.

The lower part of the apparatus differs from that shown in Fig. 1 in that the U shaped tube $h$ is dispensed with, as also the vessel $g$ and pipes $i$, $j$ and $k$, the pipe $f$ passing directly to the gas absorption vessel $o$. This latter consists of a cast-iron circular box with gas-tight cover $o'$ from which depends a central annular flange $o^2$ made to two diameters in like manner and to like relative proportions as the bell or float $l$ in Fig. 1. The pipe $f$ dips into the chemical solution contained in the box. Within the upper part of the chamber formed by the annular flange $o^2$ lies a float or inverted bell $p$, which is suspended from a light lever $r$ supported by knife edges $r'$ on bearing blocks $s$. Said lever is adjustably counter-weighted at one end and at its other end carries the pen-carrying arm $l'$ which is also fulcrumed on knife edges, and is also counter-weighted at its lower end in order to yieldingly hold the pen against the face of the chart on the clock-driven drum. A strut $r^2$ serves to support the lever $r$ when at rest.

The pipe $t$ for allowing of the escape of the tested gases is taken from the top of the vessel $o$ to a point on a level with the bend of the siphon pipe $d$ and then turned down until its free end lies rather more than half-way down the side of the vessel $a$. The upper parts of the pipe $t$ lie within a tube $u$ closed at the bottom and open at the top and at its bottom end connected by a pipe $t'$ to the vessel $a$. Water from the vessel $a$ enters the tube $u$ via the pipe $t'$ and the level of the water in the tube rises and falls with the level of the water in the vessel $a$, therefore, on the water rising to discharge the gases into the vessel $o$, the upper end of the pipe $t$ is sealed by the water in the tube $u$, and on the water sinking to draw fresh gases into the vessel $a$, the end of the pipe $t$ becomes unsealed when the water has sunk below the end of the pipe, thereby allowing the tested gases to escape from the vessel $o$ into the atmosphere.

The gases to be tested enter the space $v$ within the gas absorption vessel $o$ after bubbling through the chemicals. Assuming there is 20% of $CO_2$ in the gases and that such gas is absorbed by the chemicals, the volume of gases entering the space $v$ will be such as to depress the level of the liquid in the space $v$ and raise the level of the liquid in the float chamber until it just reaches the float. Should however, there be less than 20% of $CO_2$ in the gases, the level of the chemicals in the space $v$ will be further depressed and the level in the float chamber raised, thereby raising the float $p$ which through the lever $r$ and pen arm $l$ will cause the pen $l^2$ to indicate and record on the chart the reduced percentage of $CO_2$ in the gases. In contrast with the arrangement of float shown in Fig. 1, the float in Fig. 2 only commences to rise after the gases have raised the level of the liquid to the float, and only when the percentage of $CO_2$ is less than the predetermined maximum.

The apparatus is first set to work on air and the pressure reached is marked as zero on the chart by the pen.

To ensure of a steady movement of the float and a steady reading small V slits may be formed in the bottom edge of the float. In each example the ends of the pipes dipping in the water, mercury or chemicals is preferably chamfered off, to allow of the pipe ends being gradually sealed, or uncovered, or to allow of the gases more readily bubbling through the liquor.

The making of the shorter limb of the siphon pipe of wider proportions than the other parts of the pipe, is in order to ensure of a quick and complete breaking of the siphon action when the lower end of the pipe is uncovered.

The advantage of admitting water to the vessel $a$ via the narrow and deep cistern $b$ is that the cistern $b$ allows of any air bubbles in the water escaping before reaching the vessel $a$. Near its top end the cistern is provided with an overflow pipe $b^2$. The pipe $t'$ is preferably made of considerable length (see Fig. 4) so as to prevent air being drawn into the vessel $a$ when the pipe $t$ is unsealed.

The vessels and pipes will be of materials suitable for resisting the action of the gases and chemicals and where necessary rubber will be used for connecting one length of pipe to another.

A practical embodiment of the arrangement of apparatus shown in Fig. 2, is shown in Figs. 3 to 6. The letters of reference used with Fig. 2 are applied to the same parts in Figs. 4, 5 and 6.

A gauge glass $w$ may be applied to the gas absorption vessel $o$ to indicate the level of the chemicals, see Fig. 5. And a rubber outlet pipe $x$ and pinch cock $x'$ may be provided to allow of the emptying of the vessel when fresh chemicals are required.

The clock-driven drum $n$ will preferably be supported on a stand $n'$ resting upon the cover $o'$ of the vessel $o$. The whole apparatus will usually be enclosed in a wood cabinet or case $y$ with glazed door, the cistern $b$ and the gas inlet pipe $o$ extending through the top of the case and the longer limb of the siphon pipe $d$ extending through the floor of the case.

As before stated, the improved apparatus may be employed in the testing of exit and other gases for other constituents than $CO_2$, the chemicals in the vessel $o$ being varied to suit.

Fig. 7 illustrates a portion of the chart paper, the vertical lines 1 being those made by the pen, which in conjunction with the horizontal line 2 indicate the percentage of $CO_2$ with each test, and in conjunction with the vertical lines 1 indicate the percentages of $CO_2$ over any given period of time.

What we claim is:—

1. Apparatus for the continuous and automatic analysis of flue and other gases by the absorption process and the continuous and automatic recording of such analysis, comprising, in combination, an enclosed gas-collecting vessel, a tube-like cistern alongside said vessel and connected at its lower end by a pipe to the bottom of the vessel, a gas inlet pipe extending down through the top of the vessel to a point near the lower end, a siphon pipe, the shorter limb of which passes through the top of the vessel and extends down to a level slightly above the level of the said gas-inlet pipe and is of larger diameter than the other parts of the siphon pipe, a further pipe also passing through the top of the vessel and downwards within the vessel to a point about a third of the way down the vessel and at its other end, outside the vessel, dipping into a water seal, a gas-discharge pipe extending upwards into a thimble-like extension on the cover of the vessel at one end, and downwards through the floor of the vessel and into a further vessel at its other end, said further vessel being partially filled with chemicals which serve to seal the lower end of the pipe, and a further pipe connected with said further vessel at one end and at the other end entering a liquid seal, which is controlled by the emptying and refilling of the gas-collecting vessel, substantially as herein set forth.

2. Apparatus for the continuous and automatic analysis of flue and other gases by the absorption process and the continuous and automatic recording of such analysis, comprising, in combination, an enclosed gas-collecting vessel, a tube-like cistern alongside said vessel and connected at its lower end by a pipe to the bottom of the vessel, a gas-inlet pipe extending down through the top of the vessel to a point near the lower end, a siphon pipe, the shorter limb of which passes through the top of the vessel and extends down to a level slightly above the level of the said gas-inlet pipe and is of larger diameter than the other parts of the siphon pipe, a further pipe also passing through the top of the vessel and downwards within the vessel to a point about a third of the way down the vessel and at its other end, outside the vessel, dipping into a water seal, a gas-discharge pipe extending upwards into a thimble-like extension on the cover of the vessel at one end, and downwards through the floor of the vessel and into a further vessel at its other end, said further vessel having a cover and an annular flange of two diameters depending from said cover and dividing the chamber into a gas chamber and a float chamber, a float within the latter, a pen, means connecting the float with the pen, and a clock-driven drum carrying a time and percentage chart, a further pipe connected with said further vessel at one end and at the other end entering a liquid seal which is controlled by the emptying and refilling of the gas-collecting vessel, substantially as herein set forth.

3. Apparatus for the continuous and automatic analysis of flue and other gases by the absorption process and the continuous and automatic recording of such analysis, comprising, in combination, an initial gas measuring chamber, a residual gas measuring chamber and means whereby the withdrawal of the sealing liquid from the initial gas measuring chamber by a vacuum serves to unseal the exit of the residual gas measuring chamber, as set forth.

In witness whereof we have hereunto set our hands in the presence of two witnesses.

WALTER DOUGLAS RUSSELL BROWN.
WILLIAM THOMAS PICKSTON.

Witnesses:
H. Y. JUNCA,
W. HARREL LITTLE.